United States Patent
Manaka

(10) Patent No.: US 11,773,980 B2
(45) Date of Patent: Oct. 3, 2023

(54) SEALING DEVICE

(71) Applicant: NOK CORPORATION, Tokyo (JP)

(72) Inventor: Yuto Manaka, Fukushima (JP)

(73) Assignee: NOK CORPORATION, Tokyo (JP)

( * ) Notice: Subject to any disclaimer, the term of this patent is extended or adjusted under 35 U.S.C. 154(b) by 54 days.

(21) Appl. No.: 17/603,986

(22) PCT Filed: Apr. 15, 2020

(86) PCT No.: PCT/JP2020/016591
§ 371 (c)(1),
(2) Date: Oct. 15, 2021

(87) PCT Pub. No.: WO2020/230506
PCT Pub. Date: Nov. 19, 2020

(65) Prior Publication Data
US 2022/0186838 A1 Jun. 16, 2022

(30) Foreign Application Priority Data
May 16, 2019 (JP) .................................. 2019-092714

(51) Int. Cl.
*F16J 15/3204* (2016.01)
(52) U.S. Cl.
CPC ................... *F16J 15/3204* (2013.01)
(58) Field of Classification Search
CPC .... F16J 15/00; F16J 15/16; F16J 15/50; F16J 15/52; F16J 15/32; F16J 15/3204;
(Continued)

(56) References Cited

U.S. PATENT DOCUMENTS 4,183,543 A * 1/1980 Antonini .............. F16J 15/3244
277/560
5,002,289 A * 3/1991 Yasui ................... F16J 15/3244
277/559
(Continued)

FOREIGN PATENT DOCUMENTS

GB      1 556 870        11/1979
GB      1556870 A  *  11/1979   ............ F16J 15/3244
(Continued)

OTHER PUBLICATIONS

Official Communication issued in International Bureau of WIPO Patent Application No. PCT/JP2020/016591, dated Jun. 9, 2020.
(Continued)

*Primary Examiner* — Nathan Cumar
(74) *Attorney, Agent, or Firm* — GREENBLUM & BERNSTEIN, P.L.C.

(57) ABSTRACT

Provided is a sealing device capable of exhibiting a screw pumping effect in an early stage while inhibiting leakage of a fluid to be sealed by providing thread protrusions. A second inclined surface is provided with a plurality of first thread protrusions that cause a fluid to be sealed to flow toward a region to be sealed when the seal lip rotates in one direction relative to a shaft, and a plurality of second thread protrusions that cause the fluid to be sealed to flow toward the region to be sealed when the seal lip rotates in another direction relative to the shaft. In a state before progress of sliding wear on the seal lip, a sidewall of each of the first thread protrusions on a side facing the region to be sealed and a sidewall of each of the second thread protrusions on the side facing the region to be sealed are both designed to be parallel to a center axis line of the shaft in a state in which the seal lip is in contact with a surface of the shaft.

2 Claims, 4 Drawing Sheets

(58) Field of Classification Search
CPC .. F16J 15/3208; F16J 15/3212; F16J 15/3216; F16J 15/322; F16J 15/3224; F16J 15/3228; F16J 15/3232; F16J 15/3236
USPC ........................................................ 277/549
See application file for complete search history.

(56) References Cited

U.S. PATENT DOCUMENTS

2018/0119820 A1\* 5/2018 Honma ................ F16J 15/3276
2021/0010599 A1   1/2021 Yonai et al.

FOREIGN PATENT DOCUMENTS

| JP | 1-312274 | 12/1989 |
| JP | 10-19135 | 1/1998 |
| JP | 10-19136 | 1/1998 |
| JP | 2003-240126 | 8/2003 |
| JP | 2006-189116 | 7/2006 |
| WO | 2020/045070 | 3/2020 |

OTHER PUBLICATIONS

Extended European Search Report issued in EP Application No. 20806853.6, dated Dec. 7, 2022.

\* cited by examiner

SEALING DEVICE

TECHNICAL FIELD

The present disclosure relates to a sealing device provided with thread protrusions that exhibit a screw pumping effect.

BACKGROUND ART

For a sealing device such as an oil seal, it is a known technique to provide thread protrusions that exhibit a screw pumping effect on an inclined surface of a lip end of a seal lip on the opposite side to a region to be sealed in order to cause a fluid to be sealed leaking from the lip end of the seal lip back toward the region to be sealed. It is also a known technique, for a configuration in which a shaft rotates in both directions relative to the seal lip (sealing device), to provide thread protrusions that exhibit a screw pumping effect when the shaft rotates in a forward direction, and thread protrusions that exhibit a screw pumping effect when the shaft rotates in a reverse direction. With this technique, sometimes, the thread protrusions for reverse rotation could become the cause of leakage during the rotation in the forward direction, and the thread protrusions for forward rotation could become the cause of leakage during the rotation in the reverse direction. This issue is explained with reference to FIG. 4. FIG. 4 is an enlarged schematic cross-sectional view illustrating a part near a seal lip of a sealing device according to a conventional example.

This sealing device is provided with thread protrusions 720 that exhibit a screw pumping effect on an inclined surface 710 of a lip end of a seal lip 700 on the opposite side (A) to a region to be sealed (O). The thread protrusions 720 are configured to rise vertically from the inclined surface 710.

In the sealing device configured as described above, conventionally, the thread protrusion 720 is designed to have an end portion on the side facing the region to be sealed (O) in contact with the surface of the shaft in a state before the progress of sliding wear on the seal lip 700 so that the screw pumping effect is exhibited from an early stage of use. The dot line 500X in FIG. 4 indicates the position of the surface of the shaft in an early stage where the screw pumping effect is to be exhibited. In this conventional example, there is a step between an end (edge) portion of the thread protrusion 720 on the side facing the region to be sealed (O) and the inclined surface 710 by a distance T in FIG. 4. This step accordingly creates a small gap between the surface of the shaft 500 and the lip end. The fluid to be sealed would sometimes be scattered from the gap that is formed because of the step by T mentioned above near the thread protrusions for reverse rotation, particularly during high-speed rotation, while this is not an issue in cases like during forward rotation since the screw pumping effect is exhibited by the thread protrusions for forward rotation. The applicants of the present disclosure have accordingly proposed a technique whereby the thread protrusions 720 do not make contact with the surface of the shaft 500 in a state before the progress of sliding wear on the seal lip 700 to solve this issue (see PTL 1). Namely, as illustrated in FIG. 4, the thread protrusion 720 is designed to have its end portion on the side facing the region to be sealed (O) spaced away by distance Y from the surface of the shaft 500 in a state before the progress of sliding wear on the seal lip 700. This inhibits creation of the small gap between the surface of the shaft 500 and the lip end due to the step by T mentioned above.

However, another issue with this technique is that the function that the thread protrusions are supposed to provide, i.e., the screw pumping effect, is not fully exhibited because the thread protrusions 720 are spaced from the surface of the shaft 500 in the state before the progress of sliding wear on the seal lip 700. Namely, there is still some scope of improvement.

CITATION LIST

Patent Literature

[PTL 1]
Japanese Patent Application Laid-open No. 2006-189116

SUMMARY OF INVENTION

Technical Problem

An object of the present disclosure is to provide a sealing device capable of exhibiting a screw pumping effect in an early stage while inhibiting leakage of a fluid to be sealed by providing thread protrusions.

Solution to Problem

The present disclosure adopts the following means to achieve the object noted above.

Namely, a sealing device according to the present disclosure is a sealing device including
- a seal lip that is configured to slide on a surface of a shaft that rotates relative to the sealing device,
- the seal lip having a lip end formed of a first inclined surface radially expanding toward a region to be sealed and a second inclined surface radially expanding toward an opposite side to the region to be sealed,
- the second inclined surface being provided with a plurality of first thread protrusions that is configured to cause a fluid to be sealed to flow toward the region to be sealed when the seal lip rotates in one direction relative to the shaft, and a plurality of second thread protrusions that is configured to cause the fluid to be sealed to flow toward the region to be sealed when the seal lip rotates in another direction relative to the shaft, and
- in a state before progress of sliding wear on the seal lip, a sidewall of each of the first thread protrusions on a side facing the region to be sealed and a sidewall of each of the second thread protrusions on the side facing the region to be sealed both being configured to be parallel to a center axis line of the shaft in a state in which the seal lip is in contact with a surface of the shaft.

According to the present disclosure, in the state before the progress of sliding wear on the seal lip, there is no step formed between an end (edge) portion of each thread protrusion on the side facing the region to be sealed and the second inclined surface, and even in a state in which the thread protrusions are in contact with the surface of the shaft, no gaps resulting from the existence of the thread protrusions are formed. This in turn allows the gap between the thread protrusions and the shaft to be minimum possible (or to be eliminated) in a state before the progress of sliding wear on the seal lip while leakage resulting from the thread protrusions is suppressed. Accordingly, by making this gap to be minimum possible (or to be eliminated) in a state before the progress of sliding wear on the seal lip, the screw pumping effect can be achieved in an early stage (or immediately in the case where the gap is eliminated).

Advantageous Effects of Invention

As described above, according to the present disclosure, a screw pumping effect can be exhibited in an early stage while leakage of a fluid to be sealed is inhibited by providing thread protrusions.

DESCRIPTION OF EMBODIMENTS

Modes for carrying out this disclosure will be described in detail hereinafter illustratively based on specific embodiments with reference to the drawings. It should be noted that, unless otherwise particularly specified, the sizes, materials, shapes, and relative arrangement or the like of constituent components described in the embodiments are not intended to limit the scope of this disclosure. The sealing device according to this embodiment may be favorably used for sealing purposes in various devices such as robots and servomotors for sealing a fluid to be sealed such as oil.

Embodiment

Figure 1:
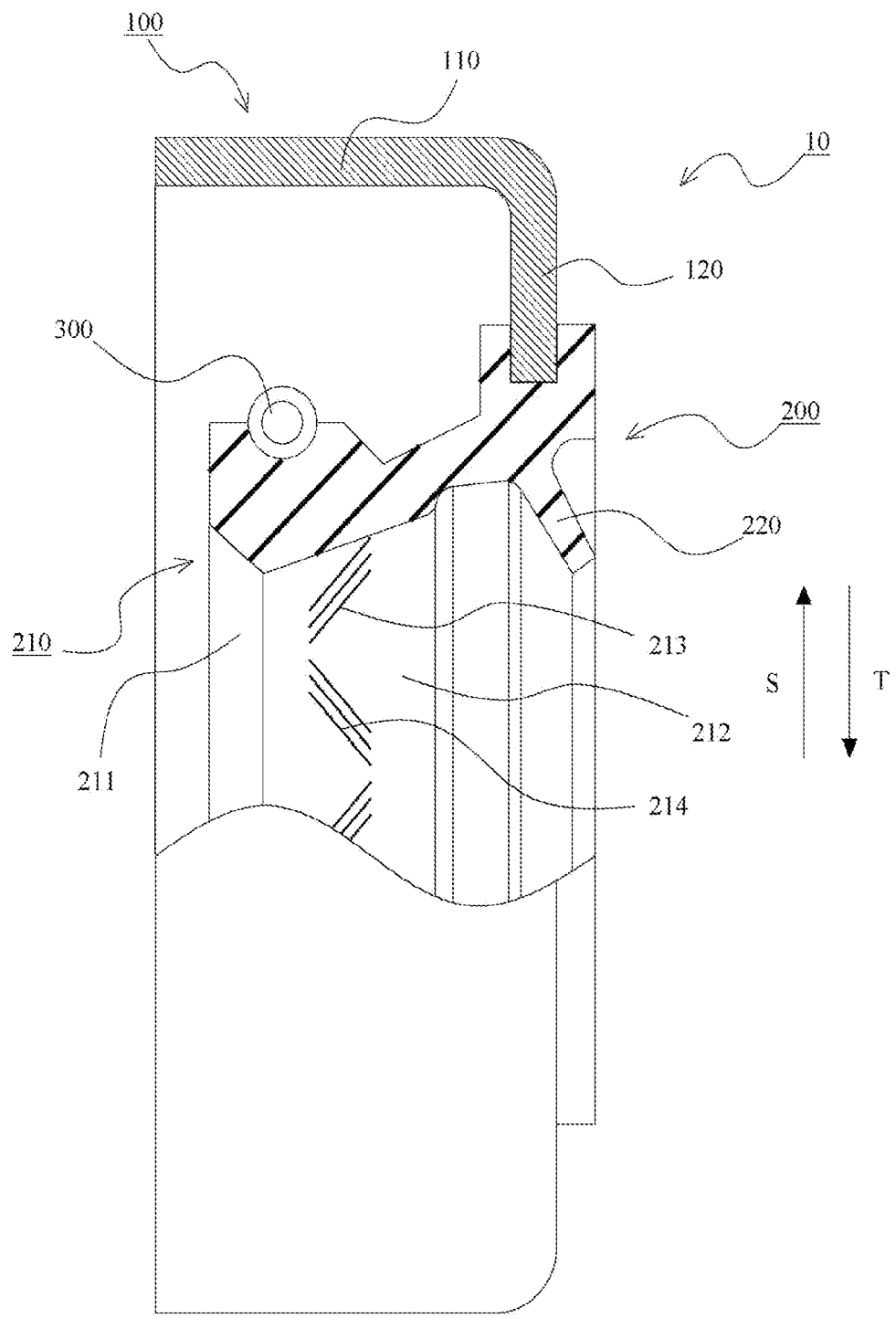
FIG. 1 is a partially broken cross-sectional view of a sealing device according to one embodiment of the present disclosure.
Figure 2:
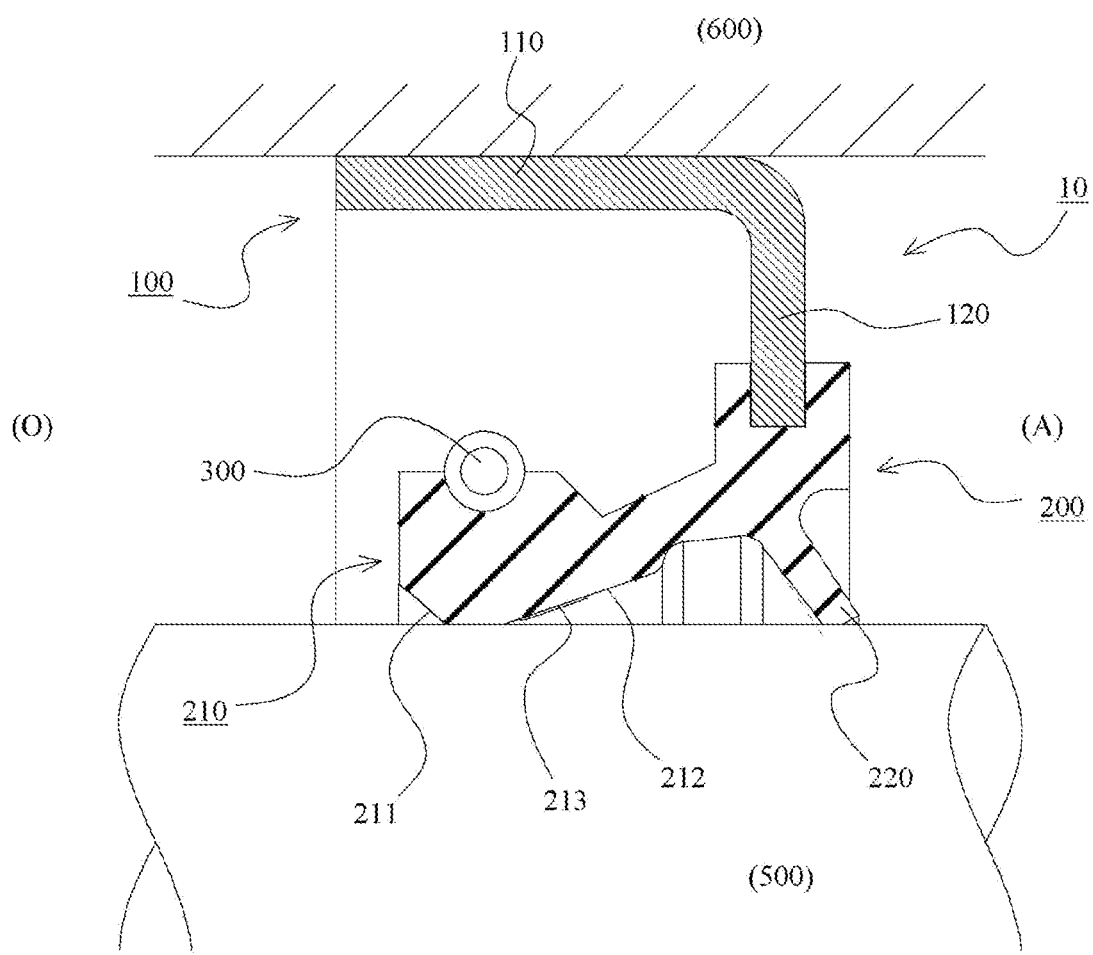
FIG. 2 is a schematic cross-sectional view of a sealing structure according to the embodiment of the present disclosure.
Figure 3:
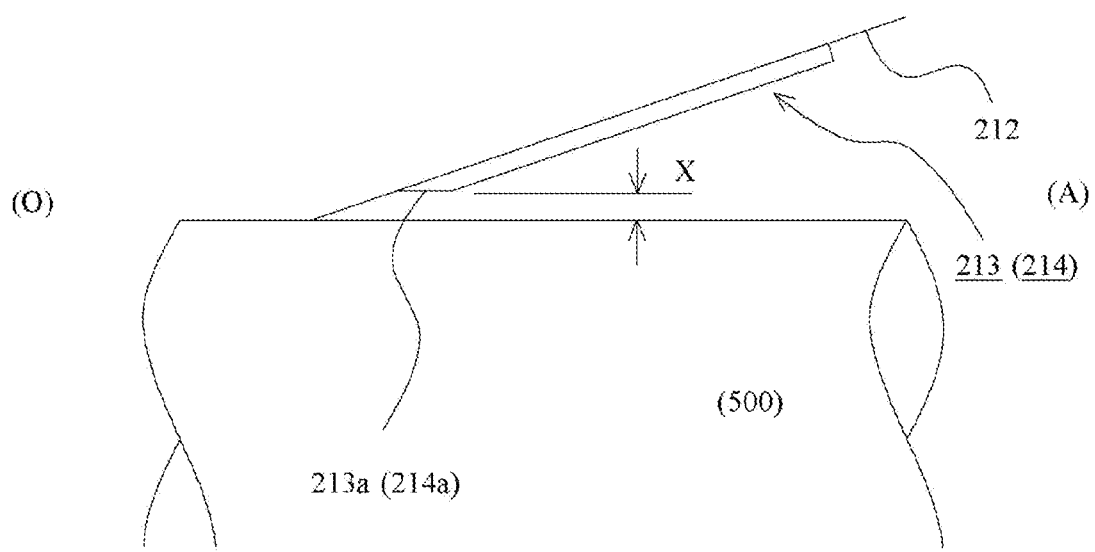
FIG. 3 is a schematic cross-sectional view illustrating a part near a seal lip of the sealing device according to the embodiment of the present disclosure to a larger scale.

A sealing device according to one embodiment of the present disclosure is described with reference to FIG. 1 to FIG. 3. FIG. 1 is a partially broken cross-sectional view of the sealing device according to one embodiment of the present disclosure. FIG. 1 illustrates a part of the sealing device as viewed from a side in a cross section cut along a plane containing the center axis line of the sealing device. FIG. 2 is a schematic cross-sectional view of a sealing structure according to the embodiment of the present disclosure. FIG. 2 illustrates the sealing device in a cross section cut along a plane containing the center axis line of the sealing device. FIG. 3 is a schematic cross-sectional view illustrating a part near a seal lip of the sealing device according to the embodiment of the present disclosure to a larger scale.

<Sealing Structure>

A sealing structure that has the sealing device 10 according to this embodiment is described with reference, in particular, to FIG. 2. The sealing structure according to this embodiment is configured by a shaft 500 and a housing 600 that rotate relative to each other, and the sealing device 10 that seals an annular gap between them. The left side of the drawing is the region to be sealed (O), where a fluid to be sealed such as oil is sealed. The right side of the drawing is the opposite side (A) from the region to be sealed (O), which is a space exposed to the atmosphere, for example.

<Sealing Device>

The sealing device 10 is described in more detail with reference, in particular, to FIG. 1 and FIG. 2. The sealing device 10 is formed by a reinforcing ring 100 made of metal or the like, and a seal main body 200 formed integrally with the reinforcing ring 100. The reinforcing ring 100 includes a cylindrical part 110 fitted and fixed to an inner circumferential surface of a shaft hole of the housing 600, and an inward flange part 120 provided to one end (on the opposite side (A)) of the cylindrical part 110. The seal main body 200 is integrally provided to the distal end of the inward flange part 120. This seal main body 200 is made of an elastic member such as rubber.

The seal main body 200 includes an integrally formed seal lip 210 and a dust lip 220, the seal lip extending from the distal end of the inward flange part 120 radially inward and toward the region to be sealed (O) and making slidable close contact with the surface of the shaft 500, and the dust lip being located closer to the opposite side (A) to the region to be sealed (O) than the seal lip 210. The lip end of the seal lip 210 is formed of a first inclined surface 211 radially expanding toward the region to be sealed (O) and a second inclined surface 212 radially expanding toward the opposite side (A) to the region to be sealed (O). A garter spring 300 is mounted on the radially outer side of the seal lip 210 to press the lip end against the surface of the shaft 500.

The second inclined surface 212 is provided with thread protrusions that exhibit a screw pumping effect.

<Thread Protrusion>

The thread protrusions provided to the second inclined surface 212 are described with reference, in particular, to FIG. 1 and FIG. 3. The sealing device 10 according to this embodiment is favorably used in cases where the shaft 500 and the housing 600 are configured to be able to rotate in both directions (forward and reverse rotations) relative to each other. Namely, the sealing device 10 according to this embodiment is configured such that the screw pumping effect by the thread protrusions is exhibited in both cases where the shaft 500 rotates in one direction (forward rotation) relative to the housing 600 and sealing device 10 and where the shaft rotates in the other direction (reverse rotation).

More specifically, the second inclined surface 212 is provided with a plurality of first thread protrusions 213 that cause the fluid to be sealed to flow toward the region to be sealed (O) when the seal lip 210 rotates in one direction relative to the shaft 500. The second inclined surface 212 is also provided with a plurality of second thread protrusions 214 that cause the fluid to be sealed to flow toward the region to be sealed (O) when the seal lip 210 rotates in the other direction relative to the shaft 500. Here, rotation of the seal lip 210 in the direction of arrow S in FIG. 1 relative to the shaft 500 corresponds to the rotation "in one direction" mentioned above, while rotation of the seal lip 210 in the direction of arrow T in FIG. 1 relative to the shaft 500 corresponds to the rotation "in the other direction" mentioned above. In the illustrated example, the plurality of thread protrusions are arranged such that a set of three first thread protrusions 213 and a set of three second thread protrusions 214 alternate each other. Note that the arrangement of the thread protrusions is not limited to the illustrated example. The thread protrusions may be arranged such that a set of two, or four or more, first thread protrusions 213 and similarly a set of two, or four or more, second thread protrusions 214 alternate each other. Alternatively, one each first thread protrusion 213 and second thread protrusion 214 may be arranged to alternate each other.

In a state before the progress of sliding wear on the seal lip 210, a sidewall 213a of the first thread protrusion 213 on the side facing the region to be sealed (O) is designed to be parallel to the center axis line of the shaft 500 in the state in which the seal lip 210 is in contact with the surface of the shaft 500. In other words, in the state before the progress of sliding wear on the seal lip 210, the sidewall 213a of the first thread protrusion 213 on the side facing the region to be sealed (O) is designed to be parallel to the surface of the shaft 500 (see FIG. 3) in the state in which the seal lip 210 is in contact with the surface of the shaft 500. Note that the above description that the sidewall 213a is designed to be parallel to the center axis line of the shaft 500 (or the surface of the shaft 500) in the state in which the seal lip 210 is in contact with the surface of the shaft 500 shall include not only a sidewall 213a that is parallel to the center axis line of the shaft 500 (or the surface of the shaft 500) but shall also include a sidewall that is slightly out of parallel because of this design when the seal lip 210 actually contacts the surface of the shaft 500. The same applies to the sidewall 214a to be described next.

Similarly, in the state before the progress of sliding wear on the seal lip 210, a sidewall 214a of the second thread protrusion 214 on the side facing the region to be sealed (O) is designed to be parallel to the center axis line of the shaft 500 in the state in which the seal lip 210 is in contact with the surface of the shaft 500. In other words, in the state before the progress of sliding wear on the seal lip 210, the sidewall 214a of the second thread protrusion 214 on the side facing the region to be sealed (O) is designed to be parallel to the surface of the shaft 500 (see FIG. 3) in the state in which the seal lip 210 is in contact with the surface of the shaft 500.

Advantages of the Sealing Device According to this Embodiment

Figure 4:
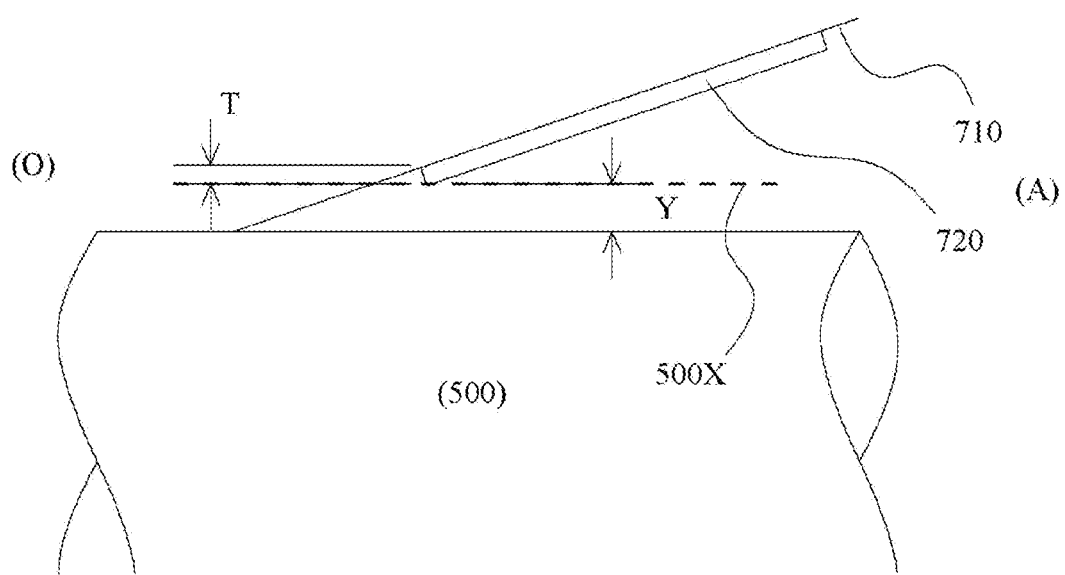
FIG. 4 is a schematic cross-sectional view illustrating a part near a seal lip of a sealing device according to a conventional example to a larger scale.

According to the sealing device 10 of this embodiment, in the state before the progress of sliding wear on the seal lip 210, there is no step formed between an end (edge) portion of each thread protrusion (first thread protrusion 213 and second thread protrusion 214) on the side facing the region to be sealed and the second inclined surface 212. That is, the distance T in FIG. 4 mentioned in the description of the background art can be made zero. Combined with the fact that the sidewall 213a and sidewall 214a are parallel to the center axis line of the shaft 500 (parallel to the surface of the shaft 500), no gaps resulting from the existence of the thread protrusions are formed even in the state in which the thread protrusions (first thread protrusions 213 and second thread protrusions 214) are in contact with the surface of the shaft 500.

This in turn allows the gap between the thread protrusions and the shaft 500 (gap X in FIG. 3) to be minimum possible (or to be eliminated) in the state before the progress of sliding wear on the seal lip 210 while leakage resulting from the thread protrusions is suppressed. Accordingly, by making this gap X to be minimum possible (or to be eliminated) in the state before the progress of sliding wear on the seal lip 210, the screw pumping effect can be achieved in an early stage (or immediately in the case where the gap X is eliminated).

As described above, the sealing device 10 according to the present disclosure can exhibit a screw pumping effect in an early stage while inhibiting leakage of the fluid to be sealed by providing the thread protrusions (first thread protrusions 213 and second thread protrusions 214).

(Others)

Although an embodiment has been described with respect to a sealing device having a dust lip 220 in addition to a seal lip 210, the sealing device of the present disclosure is not limited to this configuration. Namely, the sealing device of the present disclosure is applicable at least to various sealing devices having a seal lip provided with the first thread protrusions and second thread protrusions. The present disclosure can therefore be applied to a sealing device that does not include a dust lip, and to a sealing device that has an auxiliary seal lip additionally between a seal lip provided with thread protrusions and a dust lip. The present disclosure can also be applied to a sealing device having other configurations that, for example, further includes an end face lip slidable on an end face of a flange-shaped member fixed to the shaft. While one example of a sealing device that has a reinforcing ring has been described in the embodiment above, the sealing device of the present disclosure is applicable also to a sealing device that does not include a reinforcing ring.

REFERENCE SIGNS LIST

10 Sealing device
100 Reinforcing ring
110 Cylindrical part
120 Inward flange part
200 Seal main body
210 Seal lip
213 First thread protrusion
213a Sidewall
214 Second thread protrusion
214a Sidewall
220 Dust lip
300 Garter spring
500 Shaft
600 Housing

The invention claimed is:

1. A sealing device comprising:
a seal lip that is configured to slide on a surface of a shaft that rotates relative to the sealing device,
the seal lip having a lip end formed of a first inclined surface that is configured to radially expand towards a region to be sealed and a second inclined surface that is configured to radially expand towards an opposite side to the region to be sealed,
the second inclined surface being provided with a plurality of first thread protrusions that is configured to cause a fluid to be sealed to flow toward the region to be sealed as a result of the seal lip rotating in one direction relative to the shaft, and a plurality of second thread protrusions that is configured to cause the fluid to be sealed to flow toward the region to be sealed as a result of the seal lip rotating in another direction relative to the shaft, and
in a state before progress of sliding wear on the seal lip, a sidewall, which is nearest the lip end, of each of the first thread protrusions and a sidewall, which is nearest the lip end, of each of the second thread protrusions both being configured to extend parallel to a center axis line of the shaft in a state in which the seal lip is in contact with a surface of the shaft.

2. A sealing device, comprising:
a seal lip that is configured to slide on a surface of a shaft that rotates relative to the sealing device,
the seal lip having a lip end formed of a first inclined surface that is configured to radially expand towards a region to be sealed and a second inclined surface that is configured to radially expand towards an opposite side to the region to be sealed, the second inclined surface being provided with a plurality of first thread protrusions that is configured to cause a fluid to be sealed to flow toward the region to be sealed as a result of the seal lip rotating in one direction relative to the shaft, and a plurality of second thread protrusions that is configured to cause the fluid to be sealed to flow toward the region to be sealed as a result of the seal lip rotating in another direction relative to the shaft, and in a state before progress of sliding wear on the seal lip, a sidewall, which is nearest the lip end, of each of the first thread protrusions and a sidewall, which is nearest the lip end, of each of the second thread protrusions both being configured to extend parallel to a surface of the shaft in a state in which the seal lip is in contact with a surface of the shaft.

* * * * *